US011716763B2

(12) United States Patent
Ohara et al.

(10) Patent No.: US 11,716,763 B2
(45) Date of Patent: Aug. 1, 2023

(54) USER EQUIPMENT, BASE STATION, AND RANDOM ACCESS CONTROL METHOD

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 56 days.

(21) Appl. No.: 16/624,024

(22) PCT Filed: Jun. 27, 2017

(86) PCT No.: PCT/JP2017/023650
§ 371 (c)(1),
(2) Date: Dec. 18, 2019

(87) PCT Pub. No.: WO2019/003324
PCT Pub. Date: Jan. 3, 2019

(65) Prior Publication Data
US 2020/0178306 A1    Jun. 4, 2020

(51) Int. Cl.
*H04W 4/00* (2018.01)
*H04W 74/08* (2009.01)
*H04W 72/0446* (2023.01)

(52) U.S. Cl.
CPC ... *H04W 74/0833* (2013.01); *H04W 72/0446* (2013.01)

(58) Field of Classification Search
CPC ............. H04W 74/0833; H04W 72/0446
See application file for complete search history.

(56) References Cited

U.S. PATENT DOCUMENTS

| 2010/0216479 | A1  | 8/2010  | Kato et al. |
| 2011/0013542 | A1  | 1/2011  | Yu et al. |
| 2012/0026952 | A1  | 2/2012  | Okubo et al. |
| 2014/0355560 | A1  | 12/2014 | Li et al. |
| 2017/0367121 | A1  | 12/2017 | Wei et al. |
| 2019/0274172 | A1* | 9/2019  | Yoon .................. H04W 74/006 |
| 2020/0008247 | A1* | 1/2020  | Kwak .................. H04B 7/0695 |

(Continued)

FOREIGN PATENT DOCUMENTS

| CN | 101686544 A   | 3/2010 |
| EP | 3471364 A1    | 4/2019 |
| JP | 2010-183287 A | 8/2010 |

(Continued)

OTHER PUBLICATIONS

Office Action in counterpart Japanese Patent Application No. 2019-526447 dated Jun. 9, 2020 (7 pages).

(Continued)

*Primary Examiner* — Siren Wei
(74) *Attorney, Agent, or Firm* — Osha Bergman Watanabe & Burton LLP

(57) ABSTRACT

A terminal is disclosed including a receiver that receives configuration information for random access. The terminal also includes a processor that determines a starting symbol position of a random access resource in one or more slots based on the configuration information. The terminal further includes a transmitter that transmits a preamble in a resource starting from the starting symbol position in the one or more slots. In other aspects, a preamble transmission method is also disclosed.

5 Claims, 10 Drawing Sheets

(A) EXAMPLE IN WHICH RACH RESOURCE AND OTHER SIGNALS ARE ARRANGED IN ONE SLOT (B) EXAMPLE OF ARRANGEMENT THAT INCLUDES REPETITION

(56) References Cited

U.S. PATENT DOCUMENTS

2020/0100273 A1\* 3/2020 Gao .................... H04L 5/0007

FOREIGN PATENT DOCUMENTS

| JP | 2014-17846 A | 1/2014 |
|---|---|---|
| JP | 2014-236366 A | 12/2014 |
| TW | 201801558 A | 1/2018 |

OTHER PUBLICATIONS

3GPP TSG RAN WG1 Meeting #88; R1-1701580 "PRACH Design Considerations" ZTE, ZTE Microelectronics; Athens, Greece; Feb. 13-17, 2017 (13 pages).
3GPP TSG RAN WG1 Meeting #89; R1-1708443 "Discussion on 4-step random access procedure for NR" NTT Docomo, Inc.; Hangzhou, P.R. China; May 15-19, 2017 (7 pages).
Extended European Search Report issued in European Application No. 17916226.8, dated Nov. 25, 2020 (11 pages).
Office Action issued in the counterpart Japanese Patent Application No. 2019-526447, dated Oct. 27, 2020 (7 pages).
International Search Report issued in PCT/JP2017/023650 dated Sep. 19, 2017 (5 pages).
Written Opinion of the International Searching Authority issued in PCT/JP2017/023650 dated Sep. 19, 2017 (4 pages).
3GPP TS 36.211 V14.2.0; "3rd Generation Partnership Project; Technical Specification Group Radio Access Network; Evolved Universal Terrestrial Radio Access (E-UTRA); Physical channels and modulation (Release 14)"; Mar. 2017 (194 pages).
NTT Docomo, Inc.; "Discussion and evaluation on NR PRACH design"; 3GPP TSG RAN WG1 Meeting #89, R1-1709187; Hangzhou, P.R. China; May 15-19, 2017 (12 pages).
Office Action issued in Indian Application No. 201937051371; dated Mar. 2, 2021 (6 pages).
Office Action issued in Chinese Application No. 201780092207.8 dated Dec. 20, 2021 (15 pages).
Office Action issued in the counterpart European Patent Application No. 17916226.8, dated May 31, 2022 (9 pages).
Nokia, Alcatel-Lucent Shanghai Bell; "NR Physical Random Access Channel"; 3GPP TSG-RAN WG1#88bis, R1-1704942; Spokane, USA; Apr. 3-7, 2017 (47 pages).
Coolpad; "Discussion on PRACH for eLAA"; 3GPP TSG RAN WG1 Meeting #85, R1-165169; Nanjing, China; May 23-27, 2016 (3 pages).
Office Action issued in the counterpart Colombian Patent Application No. NC2020/0000659, dated Apr. 13, 2022 (32 pages).
Office Action issued in the counterpart Colombian Patent Application No. NC2020/0000659, dated Oct. 27, 2022 (46 pages).
Office Action issued in counterpart Egyptian Patent Application No. 1952/2019 dated Dec. 9, 2022 (14 pages).

\* cited by examiner

USER EQUIPMENT, BASE STATION, AND RANDOM ACCESS CONTROL METHOD

TECHNICAL FIELD

The present invention relates to user equipment, a base station, and a random access control method.

BACKGROUND ART

In 3GPP (Third Generation Partnership Project), communication standards (5G or NR) as a next generation of LTE (Long Term Evolution) and LTE-Advanced have been discussed. In an NR system, as in LTE and the like, it is supposed that random access is performed in the case where user equipment (UE) establishes a connection with a base station (eNB or eNodeB) or establishes a re-connection.

When random access is performed in LTE and LTE-Advanced, the user equipment UE transmits a preamble (PRACH preamble) selected from among multiple preambles prepared in a cell. Upon detecting a preamble, the base station eNB transmits a RAR (RACH response) as response information. The user equipment UE that has received the RAR transmits an RRC Connection Request as message 3. After having received the message 3, the base station eNB transmits as message 4 an RRC Connection Setup that includes cell configuration information and the like for establishing a connection. The user equipment UE having its UE ID included in the message 4 completes the random access process, and establishes a connection.

A channel for transmitting a preamble initially in random access is referred to as a Physical Random Access Channel (PRACH), and configuration information regarding a PRACH (PRACH Configuration) is indicated to the user equipment UE by an index from the base station eNB. In other words, the user equipment UE selects a resource of PRACH (referred to as, a RACH resource, below) based on the PRACH Configuration indicated from the base station eNB.

The PRACH Configuration also corresponds to a preamble format, and the user equipment UE transmits a preamble by using a preamble format corresponding to the PRACH Configuration (see Non-patent document 1).

RELATED ART DOCUMENT

[Non-Patent Document]
[NON-PATENT DOCUMENT 1] 3GPP TS36.211 V14.2.0 (March 2017)

SUMMARY OF THE INVENTION

Problem to be Solved by the Invention

In LTE, the time length of a RACH resource determined by a preamble format corresponds to either one of one to three subframes except for preamble format 4. Preamble format 4 has the time length shorter than one subframe, which is supposed to be transmitted within an UpPTS (Uplink Pilot Time Slot) in a special subframe of TDD (Time Division Duplex).

In NR, it is supposed that preambles having various time lengths are used. For example, in the preambles of NR, it is supposed that various subcarrier spacings are supported, such as 1.25 kHz, 5.0 kHz, 15 kHz, 30 kHz, 60 kHz, and 120 kHz. Depending on the subcarrier spacing, the time length of a single OFDM (Orthogonal Frequency Division Multiplexing) symbol varies, and the time length of a RACH resource used for transmission of a preamble also varies.

Also, for beam sweeping performed when receiving a preamble at a base station, and for coverage extension by reception combining, and the like, an OFDM symbol may be repeated within a RACH resource that is used for transmission of a preamble. For example, it is also supposed that a CP (Cyclic Prefix) is provided at the head of a RACH resource and a GT (Guard Time) is provided at the end, and between these, multiple OFDM symbols are repeated. In the case where the number of repetitions of the OFDM symbol varies, even for the same subcarrier spacing, the time length of the RACH resource varies.

Furthermore, since the CP (Cyclic Prefix) length and the GT (Guard Time) length are set depending on a time delay and/or a delay spread depending on a supposed cell radius, for a different supposed cell radius, the time length of the RACH resource varies.

In this way, in NR, since the time length of a RACH resource varies by the units of OFDM symbols, there is a likelihood that RACH resource allocation by the units of subframes as conventionally performed may not result in appropriate scheduling. For example, considering scheduling in a TDD band or a Dynamic TDD, conventional RACH resource allocation by the units of subframes may not take thought of placing data and downlink control information in a subframe in which the RACH resource is to be placed. In the case where the downlink control information cannot be transmitted due to the RACH resource allocation, scheduling including data transmission is to be restricted. Also, in NR, there is a likelihood that multiple SS (Synchronization Signal) blocks may be placed depending on the supposed number of beams on the base station side. In such a case, if no RACH resource allocation method is available that is adaptive to remaining usable uplink resources in a slot in which an SS block exists, it is necessary to avoid the slot in which the SS block exists in order to allocate a RACH resource. For example, in the case where slots in which SS blocks exist are placed consecutively, it is supposed that the random access delay becomes greater.

It is desirable to place a RACH resource at an appropriate position in accordance with various use cases, for example, as described above.

In order to place a RACH resource at an appropriate position in accordance with various use cases and the like, it is an object of the present invention to provide a scheme that allocates a RACH resource by the units of OFDM symbols.

Means for Solving the Problem

A user equipment according to an embodiment of the present invention includes a configuration information manager that manages allocation information regarding a RACH resource that is allocated by units of OFDM symbols, and can be used for transmitting a preamble; and a transmitter that transmits the preamble according to the allocation information.

Effect of the Present Invention

According to the present invention, it is possible to allocate a RACH resource by the units of OFDM symbols. Furthermore, it is possible to allocate the RACH resource at an appropriate position in accordance with various use cases and the like.

EMBODIMENTS FOR CARRYING OUT THE INVENTION

In the following, embodiments will be described with reference to the drawings. Note that the embodiments described below are merely examples, and an embodiment to which the present invention could be applied is not necessarily to be limited to the following embodiments.

In the embodiments, terms defined in LTE will be used appropriately for description. Also, when a wireless communication system operates, it is possible to appropriately use existing technologies defined in LTE. However, the existing technologies are not limited to those in LTE. Also, unless otherwise specified, the term "LTE" in the present specification is used in a broader sense covering LIE-Advanced and schemes after LIE-Advanced. Also, the present invention can also be applied to schemes other than LTE, in which random access can be applied.

Also, although existing tams used in LTE, such as "RACH" and "preamble", are used in the embodiments, this is for convenience of description, and substantially the same signals as these may be differently termed.

<Overview of Wireless Communication System>

Figure 1:
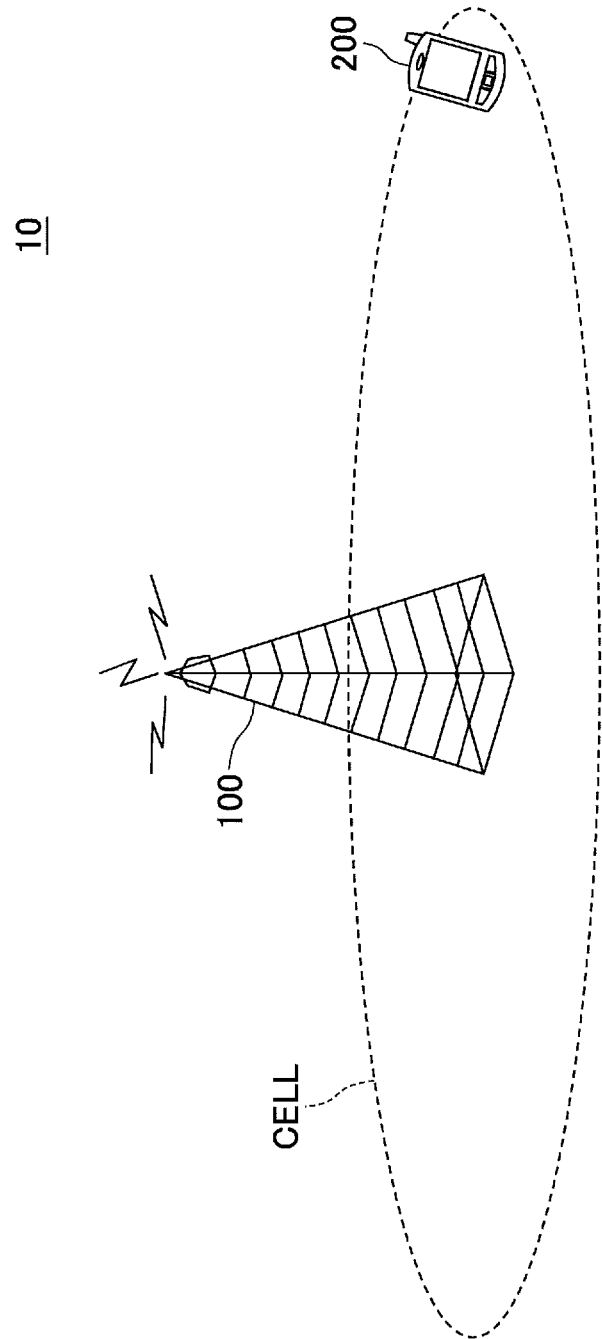
FIG. 1 is a diagram illustrating random access in a wireless communication system in an embodiment of the present invention.

FIG. 1 is a diagram illustrating random access in a wireless communication system 10 in an embodiment. As illustrated in FIG. 1, the wireless communication system 10 in the embodiment includes a base station 100 and user equipment 200. In the example in FIG. 1, although a single base station 100 and a single unit of user equipment 200 are illustrated, multiple base stations 100 and multiple units of user equipment 200 may be included. Note that the base station 100 may be referred to as "BS" and the user equipment 200 may be referred to as "UE".

The base station 100 can accommodate one or more (for example, three) cells (also referred to as sectors). In the case where the base station 100 accommodates multiple cells, the entire coverage area of the base station can be segmented into multiple smaller areas, and in each of the smaller areas, a base station subsystem (for example, an indoor small base station RRH (Remote Radio Head)) may provide communication services. The term "cell" or "sector" indicates a part or the entirety of the coverage area of the base station and/or a base station subsystem providing communication services. Further, the terms "base station", "eNB", "cell", and "sector" can be interchangeably used in the present specification. The base station 100 may be also referred to as a fixed station, a NodeB, an eNodeB (eNB), an access point, a femtocell, a small cell, or the like.

The user equipment 200 may be referred as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

When the user equipment 200 is going to establish a connection or resynchronize with the base station 100 to start transmission or handover, random access is performed. A channel for transmitting a preamble initially in random access is referred to as a Physical Random Access Channel (PRACH). The user equipment transmits a preamble by using a resource (RACH resource) indicated from the base station. The RACH resource may be indicated as a preamble format.

The RACH resource is placed, for example, at a predetermined part of resources configured in the time domain and in the frequency domain. As for the resources in the time domain, a data allocation unit on the time axis determined based on one of the subcarrier spacings, may be referred to as a "slot". A slot and a symbol both represent a time unit for transmitting a signal. A slot and a symbol may be differently termed, respectively.

In the embodiment, supposing that preambles having various time lengths are to be used, a scheme for allocating a RACH resource by the units of OFDM symbols will be described.

<Steps of Random Access in Wireless Communication System>

Figure 2:
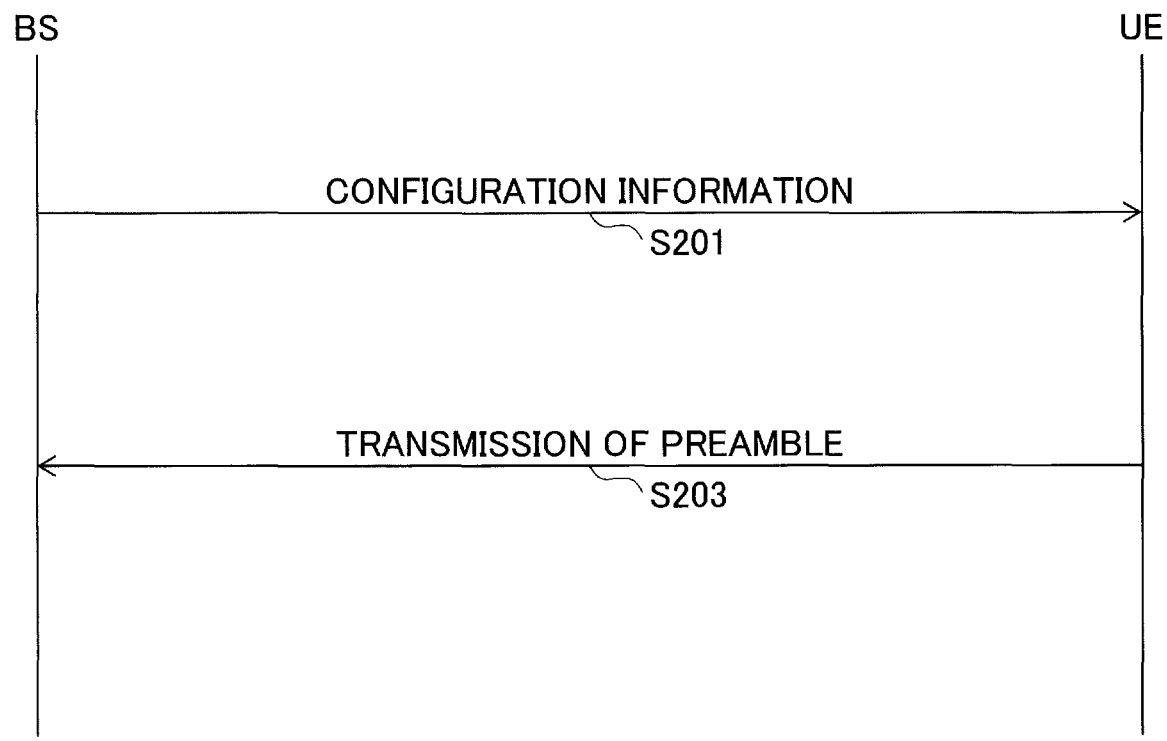
FIG. 2 is a sequence chart illustrating steps of random access in a wireless communication system according to an embodiment of the present invention.

Next, steps of random access and a method of determining transmission power of a preamble in the wireless communication system according to the present embodiment will be described in detail. FIG. 2 is a sequence chart illustrating steps of random access in the wireless communication system according to the embodiment of the present invention.

The base station 100 generates configuration information that is to be used by the user equipment 200 for transmitting a preamble in random access, and transmits the configuration information (S201). In the embodiment, the base station 100 transmits to the user equipment 200 allocation information of a RACH resource that can be used by the user equipment 200 for transmitting a preamble. The RACH resource can be set by the units of OFDM symbols, and allocation information of the RACH resource may include a position designating an OFDM symbol of the RACH resource in a slot. The allocation information may further include the number of repetitions in the case where the RACH resource is repeatedly placed in the slot along the time axis, and/or an interval between the RACH resources in the case where the RACH resource is repeatedly placed in the slot along the time axis. Supposing a case where the user equipment 200 transmits a single preamble in a single RACH resource according to the preamble format, in the case where the RACH resource is repeatedly placed, the user equipment 200 may select one of the RACH resources to transmit a preamble, or may select multiple RACH resources to transmit a preamble.

Note that before receiving the configuration information from the base station 100 (S201), the user equipment 200 receives a synchronization signal (SS), broadcast information, and the like from the base station 100. Although the slot length varies depending on the subcarrier spacing, the user equipment 200 may detect a slot based on the subcarrier spacing of an SS block that includes the synchronization signal, or may detect a slot based on the subcarrier spacing indicated by the broadcast information or the like. In the following, a slot detected by the user equipment 200 will be referred to as a supposed slot. Specific examples of RACH resource allocation in a supposed slot will be described below.

SPECIFIC EXAMPLE 1

Figure 3:
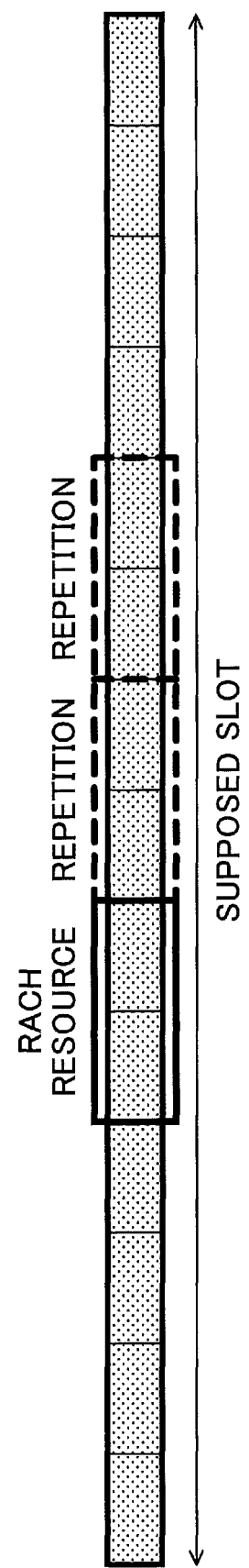
FIG. 3 is a first diagram illustrating an example of RACH resource allocation.

FIG. 3 is a first diagram illustrating an example of RACH resource allocation. For example, as illustrated in FIG. 3, in the case where 14 OFDM symbols are included in a supposed slot and an index is given to each OFDM symbol sequentially from 1, the allocation information of the RACH resource may include 5 as the starting index of the RACH resource. Note that the index does not need to be given to each OFDM symbol sequentially; for example, one index may be given to two OFDM symbols, or one index may be given to three or more OFDM symbols. For example, when the RACH resource is repeatedly placed three times, the allocation information may include 3 as the number of repetitions. Note that although FIG. 3 illustrates an example in which the RACH resource is repeated consecutively, RACH resources may be placed at a regular interval between them. In this case, the allocation information may include the interval between the RACH resources.

Figure 4:
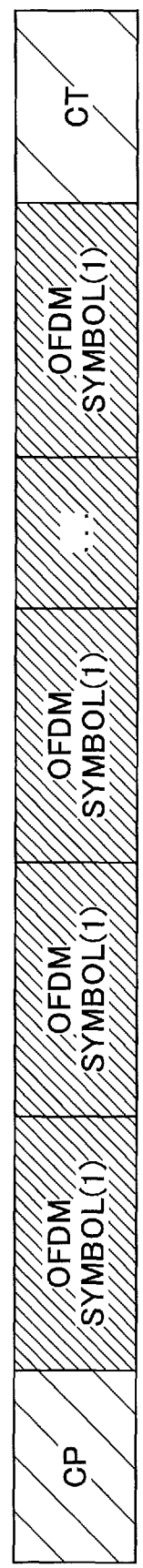
FIG. 4 is a diagram illustrating an example of a preamble transmitted in a RACH resource.

FIG. 4 is a diagram illustrating an example of a preamble transmitted in a RACH resource. In the RACH resource illustrated in FIG. 3, the user equipment 200 may transmit multiple repeated OFDM symbols. For example, as illustrated in FIG. 4, a CP may be provided at the head of the RACH resource and a GT (Guard Time) may be provided at the end, to repeatedly transmit multiple OFDM symbols between these. Also, the CP may be inserted between the OFDM symbols, and for each OFDM symbol, a different sequence may be used.

SPECIFIC EXAMPLE 2

Figure 5:
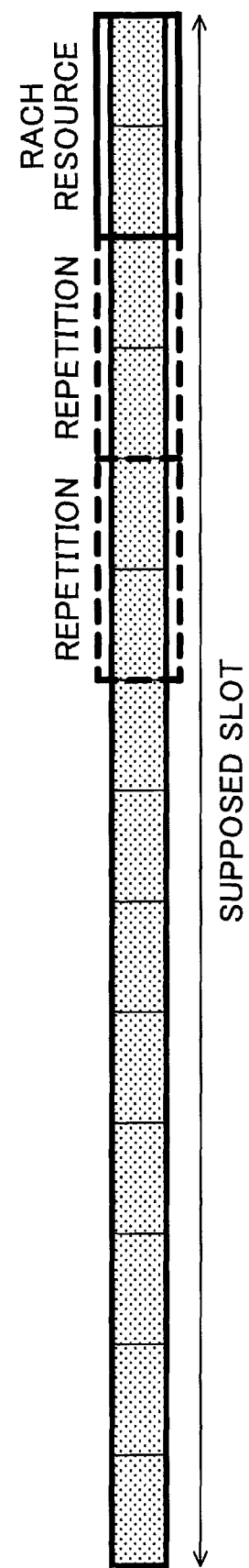
FIG. 5 is a second diagram illustrating an example of RACH resource allocation.

FIG. 5 is a second diagram illustrating an example of RACH resource allocation. For example, as illustrated in FIG. 5, a RACH resource may be placed at a predetermined position in the back of a supposed slot. Note that the RACH resource may not be always placed at the end of the supposed slot, and may be placed at a position several OFDM symbols before from the end. Also, the RACH resource may be repeatedly placed from the end to the front. For example, when the RACH resource is repeatedly placed three times, the allocation information may include 3 as the number of repetitions. Note that although FIG. 5 illustrates an example in which the RACH resource is repeated consecutively, RACH resources may be placed at a regular interval between them. In this case, the allocation information may include the interval between the RACH resources.

Figure 6:
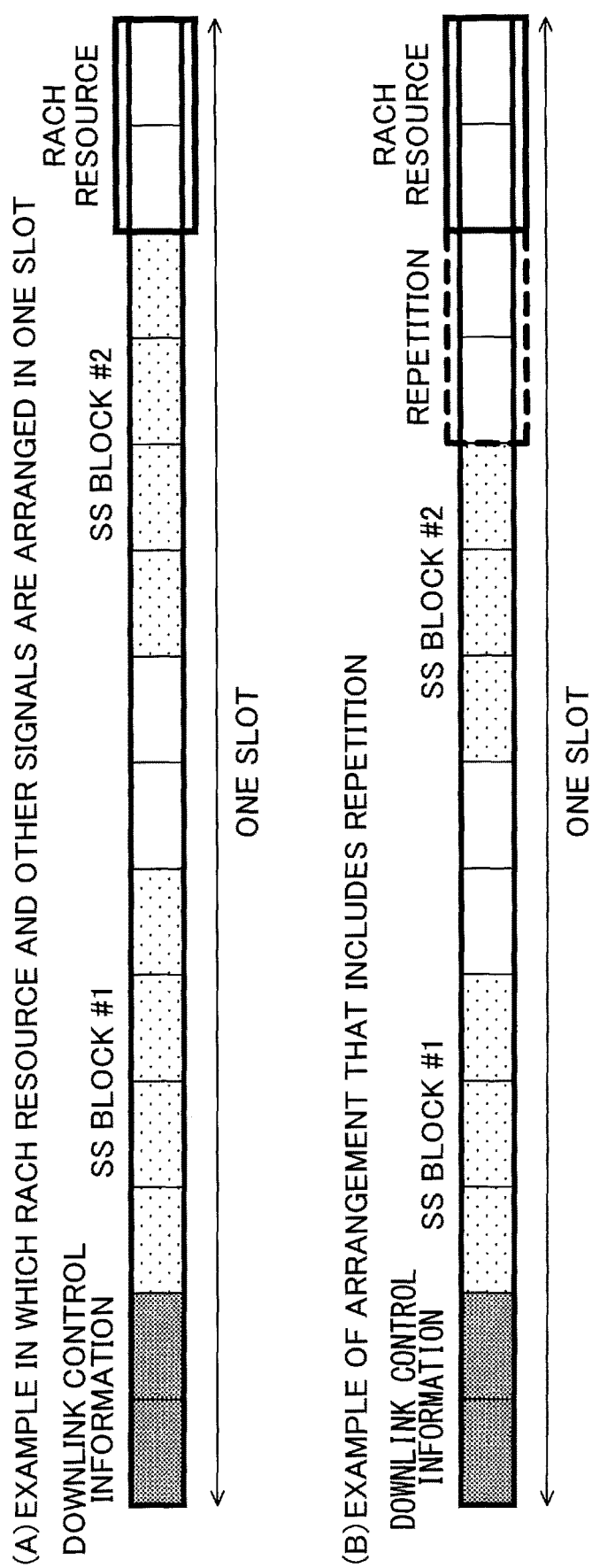
FIG. 6 includes diagrams illustrating examples in which a RACH resource and other signals are placed in a single slot.

FIG. 6 includes diagrams illustrating examples in which a RACH resource and other signals are placed in a single slot. FIG. 6(A) illustrates an example in which a single RACH resource is placed at the end of a supposed slot, and FIG. 6(B) illustrates an example in which a RACH resource is placed at the end of a supposed slot and repeated from the end to the front. For example, in first several OFDM symbols (for example, first to third OFDM symbols) in the slot, downlink control information that includes scheduling information of downlink data determined by the base station 100 may be placed. Furthermore, multiple SS blocks may be placed in the slot. Provided that downlink control information and SS blocks are not placed in OFDM symbols in the back, by placing the RACH resource starting from the back as illustrated in FIG. 5, it is possible to avoid the downlink control information and the SS blocks in the case of a TDD slot. Note that although the example in FIG. 6 illustrates that the RACH resource is placed from the back, it is also possible to place a RACH resource by specifying the starting index of the RACH resource.

SPECIFIC EXAMPLE 3

Figure 7:
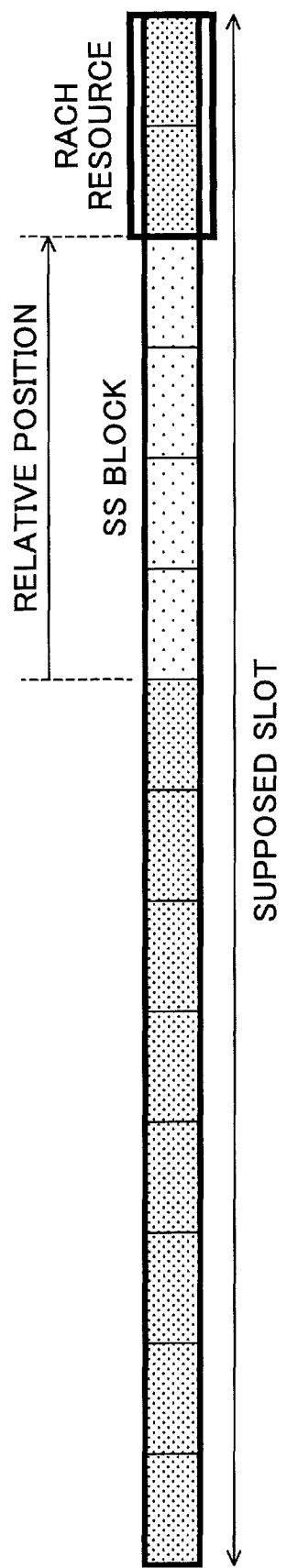
FIG. 7 is a third diagram illustrating an example of RACH resource allocation.

FIG. 7 is a third diagram illustrating an example of RACH resource allocation. For example, a RACH resource may be determined by the relative position with respect to an SS block. In other words, the allocation information of a RACH resource may also include the relative position with respect to an SS block in a slot. As described above, since the user equipment 200 can grasp a supposed slot, based on an SS block or the like that has been received or has the greatest reception power, if the relative position with respect to the SS block in the slot can be recognized, it is possible to recognize the position of the RACH resource from the SS block. Also, in the case where analog beam forming is used in the base station, it is necessary to set a RACH resource corresponding to each SS block in a time range different from each other. In this case, if the relative position with respect to each SS block is specified, it is possible for the user equipment 200 to grasp multiple RACH resources.

Note that the RACH resource may be placed repeatedly also in FIG. 7. As illustrated in FIG. 3, repeated RACH resources may be placed backwards from the RACH resource determined by the relative position with respect to an SS block, or as illustrated in FIG. 5, may be placed frontwards from the RACH resource determined by the relative position with respect to an SS block. In this way, it is possible to combine Specific example 3 with Specific example 1 or Specific example 2. For example, when the RACH resource is repeatedly placed three times, the allocation information may include 3 as the number of repetitions. Also, RACH resources may be placed at a regular interval between them. In this case, the allocation information may include the interval between the RACH resources.

SPECIFIC EXAMPLE 4

Figure 8:
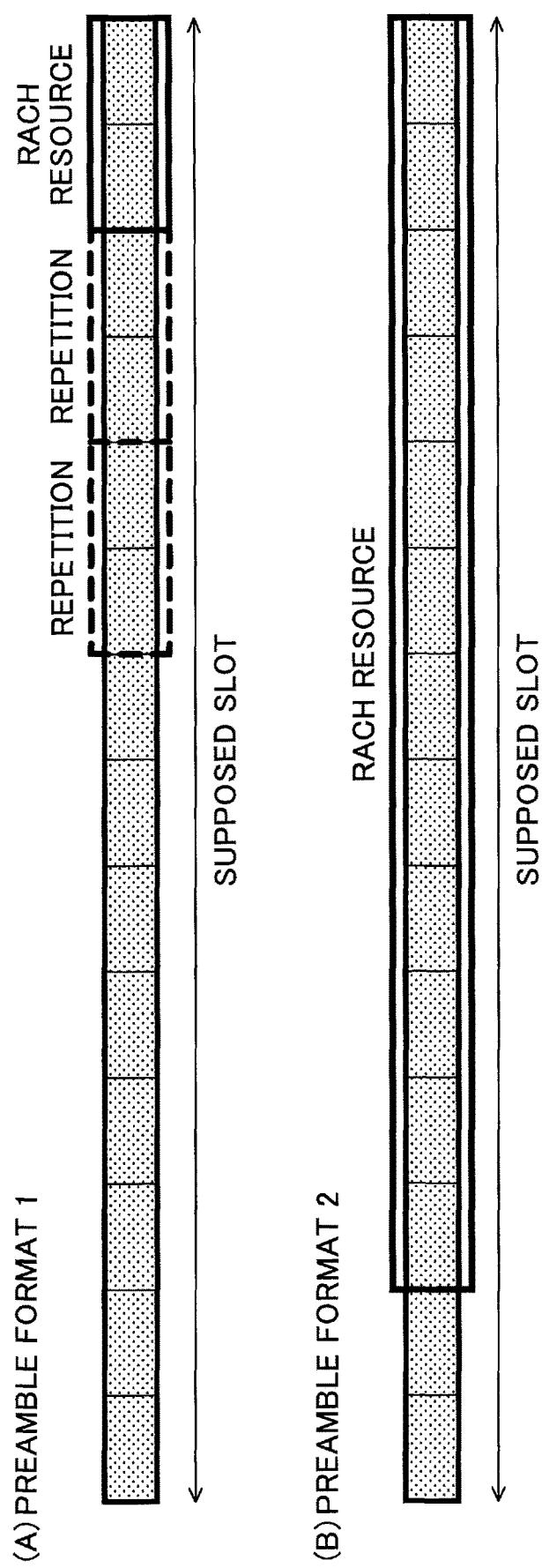
FIG. 8 includes fourth diagrams illustrating examples of RACH resource allocation.

FIG. 8 includes fourth diagrams illustrating examples of RACH resource allocation. Allocation information of RACH resources may be defined in advance for a preamble format that specifies the sequence length of a preamble, the subcarrier spacing, the CP length, the GT length, or the like. Also, an index may be given for each preamble format. For example, for preamble format 1, a RACH resource placement may be defined in which a RACH resource for two OFDM symbols is placed repeatedly three times from the back to the front of a supposed slot; or for preamble format 2, a RACH resource placement may be defined in which a RACH resource for 12 OFDM symbols is placed from the back to the front of a supposed slot. Also, different RACH resource placements may be defined for respective preamble formats, and one of them to be used may be indicated to the user equipment 200 from the base station 100 by the index. Although FIG. 8 illustrates an example in which a RACH resource is placed from the back, it is also possible to define a RACH resource placement that has a starting index specified for each preamble format, and it is also possible to define a RACH resource placement by the relative position with respect to an SS block. In this way, it is also possible to combine Specific example 4 with Specific example 1 to Specific example 3. The type of RACH resource placement to be used when the user equipment 200 transmits a preamble depending on the preamble format, may be designated in the configuration information (S201) to be transmitted to the user equipment 200 from the base station 100.

As in the above examples, the allocation information may include the number of repetitions. Also, RACH resources may be placed at a regular interval between them. In this case, the allocation information may include the interval between the RACH resources. Note that in the case where the number of repetitions and/or the interval between RACH resources are different, different RACH resource placements may be defined, and different numbers of repetitions and/or intervals between RACH resources may be specified in the same RACH resource placement.

Transmission (S201) of the configuration information from the base station 100 to the user equipment 200 may be performed by broadcast information, or may be performed by RRC (Radio Resource Control) signaling, DCI (Downlink Control Information), or the like. Transmission of the configuration information from the base station 100 to the user equipment 200 may also be performed by a combination of broadcast information, RRC signaling, DCI, and the like. In the case where such a combination is used, the user equipment 200 may use the configuration information according to the priority determined in advance. For example, in the case where configuration information is indicated by RRC signaling after configuration information has been indicated by broadcast information, the RRC signaling may be prioritized, and the configuration information indicated by the broadcast information may be discarded. Note that such priority is merely an example, and any priority may be used.

Note that it is also possible to define in advance all or a part of the above configuration information in the specification. Also, it is also possible to define not only the configuration information but also information indicated or designated to the user equipment 200 from the base station 100 in the embodiment, in the specification in advance. For example, either one of the number of repetitions in the case where a RACH resource is repeatedly placed in a slot, or the interval between RACH resources in the case where RACH resources are placed repeatedly in a slot, may be defined in the specification in advance.

Although FIG. 3 to FIG. 8 illustrate positions of RACH resources in respective slots, a RACH resource may not be always included in every slot. In other words, RACH resources may be placed in some slots, and the position in a slot having a RACH resource placed may be transmitted to the user equipment 200 from the base station 100 as the allocation information. The allocation information regarding the position in a slot having a RACH resource placed may be transmitted separately from or together with the allocation information regarding the position of the RACH resource in the slot.

For example, the index of a slot used as a reference when placing a RACH resource, and the interval (cycle) of slots repeatedly placed after the reference slot may be transmitted as the allocation information. For example, the allocation information may include that RACH resources are placed every two slots from a slot whose index is 1. Also, a slot used as a reference may be determined by the relative position or the like with respect to a slot in which an SS block exists. In this case, the allocation information may include the relative position with respect to a slot in which an SS block exists. Also, for each preamble format, different allocation information may be defined, which may be indicated to the user equipment 200 from the base station 100.

The user equipment 200 receives the configuration information from the base station 100, and transmits a preamble according to the allocation information of a RACH resource included in the configuration information (S203). Also, the base station 100 receives the preamble transmitted from the user equipment 200 according to the allocation information of the RACH resource. As described above, the user equipment 200 can grasp a supposed slot based on an SS block and the like. In the case of receiving the position designating an OFDM symbol of a RACH resource in a slot from the base station 100, the user equipment 200 transmits a preamble in the corresponding OFDM symbol.

Furthermore, in the case of receiving from the base station 100 the number of repetitions when a RACH resource is repeatedly placed in a slot, and/or the interval between RACH resources when the RACH resource is repeatedly placed in a slot, the user equipment 200 can recognize that the RACH resource is placed repeatedly. For example, as illustrated in FIG. 3, in the case of receiving the starting index and the number of repetitions of a RACH resource from the base station 100, the user equipment 200 may select either one of the RACH resources from among the RACH resources that are repeatedly placed to transmit a preamble, or may select multiple RACH resources to transmit a preamble. For example, as illustrated in FIG. 5, in the case where the RACH resource is repeatedly placed from the back to the front, the user equipment 200 may select either one of the RACH resources from among the RACH resources that are repeatedly placed from the back to the front to transmit a preamble, or may select multiple RACH resources to transmit a preamble.

Also, as illustrated in FIG. 7, in the case of receiving the relative position with respect to an SS block in a slot, the user equipment 200 recognizes the position of the RACH resource from the SS block, to transmit a preamble in the corresponding OFDM symbol. Also in this case, in the case where the RACH resource is placed repeatedly, the user equipment 200 may select either one of the RACH resources from among the RACH resources that are repeatedly placed to transmit a preamble, or may select multiple RACH resources to transmit a preamble.

Also, in the case where a preamble format to be used for transmitting a preamble has been designated by the index or the like of the preamble format from the base station 100, the user equipment 200 transmits a preamble by using the designated preamble format.

Furthermore, in the case of receiving the position of a slot in which a RACH resource is placed from the base station 100, the user equipment 200 transmits a preamble according to the allocation information of the RACH resource in the slot in which the RACH resource is placed.

<Functional Composition of Base Station>

Figure 9:
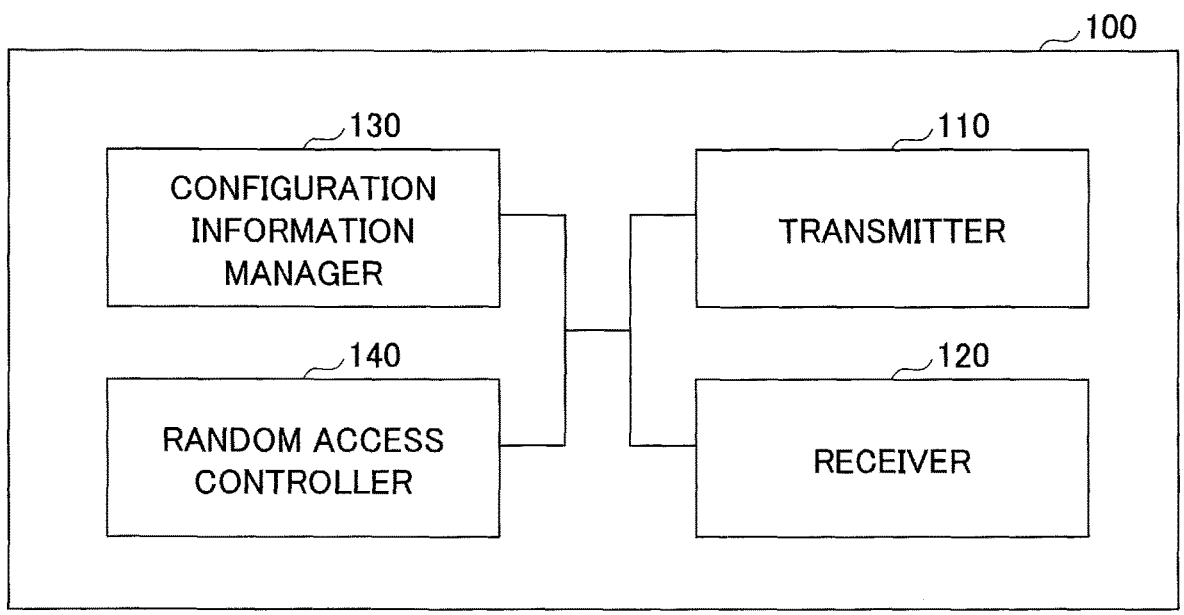
FIG. 9 is a block diagram illustrating an example of a functional configuration of a base station.

FIG. 9 is a block diagram illustrating an example of a functional configuration of the base station 100. The base station 100 includes a transmitter 110, a receiver 120, a configuration information manager 130, and a random access controller 140. The functional configuration illustrated in FIG. 9 is merely an example. As long as operations according to the present embodiment can be executed, the names of the functional segments and units may be replaced with any names.

The transmitter 110 is configured to generate a signal in a lower layer from information in a higher layer, to transmit the signal wirelessly. The receiver 120 is configured to wirelessly receive various kinds of signals, to obtain information in a higher layer from the received signals.

The configuration information manager 130 stores in advance configuration information to be set, determines configuration information to be set in the user equipment 200 dynamically and/or semi-statically (allocation information of a RACH resource in a slot, allocation information designating the position of a slot in which the RACH resource is placed, either one of configuration information items used in the embodiment, and the like), and holds the information. The configuration information manager 130 transfers the configuration information to be set in the user equipment 200 dynamically and/or semi-statically to the transmitter 110, and causes the transmitter 110 to transmit the configuration information.

The random access controller 140 manages steps of random access executed with the user equipment 200. The random access controller 140 causes the transmitter 110 to transmit a RAR in the case of receiving a preamble from the user equipment 200, and causes the transmitter 110 to transmit an RRC Connection Setup in the case of receiving an RRC Connection Request.

<Functional Configuration of User Equipment>

Figure 10:
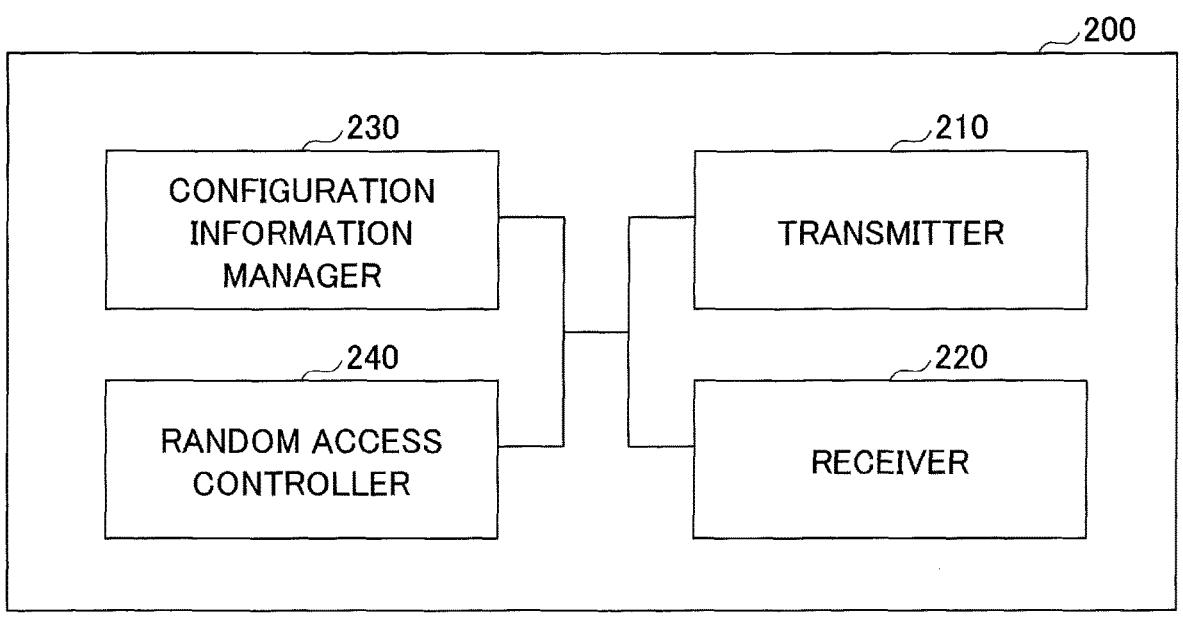
FIG. 10 is a block diagram illustrating an example of a functional configuration of user equipment.

FIG. 10 is a block diagram illustrating an example of a functional configuration of the user equipment 200. The user equipment 200 includes a transmitter 210, a receiver 220, a configuration information manager 230, and a random access controller 240. The functional configuration illustrated in FIG. 10 is merely an example. As long as operations according to the present embodiment can be executed, the names of the functional segments and units may be replaced with any names.

The transmitter 210 is configured to generate a signal in a lower layer from information in a higher layer, to transmit the signal wirelessly. The transmitter 210 transmits a preamble based on configuration information stored in the configuration information manager 230, which will be described below. The receiver 220 is configured to wirelessly receive various kinds of signals, to obtain information in a higher layer from the received signals. The receiver 220 receives from the base station 100 or the like configuration information (allocation information of a RACH resource in a slot, allocation information designating the position of a slot in which the RACH resource is placed, either one of configuration information items used in the embodiment, and the like).

The configuration information manager 230 stores in advance configuration information to be set, and stores configuration information to be set from the base station 100 dynamically and/or semi-statically (allocation information of a RACH resource in a slot, allocation information designating the position of a slot in which the RACH resource is placed, either one of configuration information items used in the embodiment, and the like). Note that configuration information that can be managed in the configuration information manager 230 includes not only the configuration information to be set from the base station 100 or the like, but also configuration information defined in the specification in advance.

The random access controller 240 manages steps of random access executed with the base station 100. When the user equipment 200 is going to establish a connection or resynchronize with the base station 100 to start transmission or handover, the random access controller 240 causes the transmitter 210 to transmit a preamble randomly selected from among multiple preambles. Also, after having transmitted a preamble, and not receiving a RAR as the response information, for example, within a period referred to as the RAR window, the random access controller 240 causes the transmitter 210 to retransmit the preamble. In the case of having received a RAR from the base station 100, the random access controller 240 causes the transmitter 210 to transmit an RRC Connection Request.

<Hardware Configuration>

Note that a block diagram used for describing the above embodiment illustrates blocks in units of functions. These functional blocks (components) are implemented in any combination of hardware and/or software. Further, a method for implementing each functional block is not specifically limited. In other words, each functional block may be implemented by a single device that is physically and/or logically combined, or may be implemented by multiple devices by directly and/or indirectly (e.g., by wire and/or wirelessly) connecting the multiple devices that are physically and/or logically separated.

Figure 11:
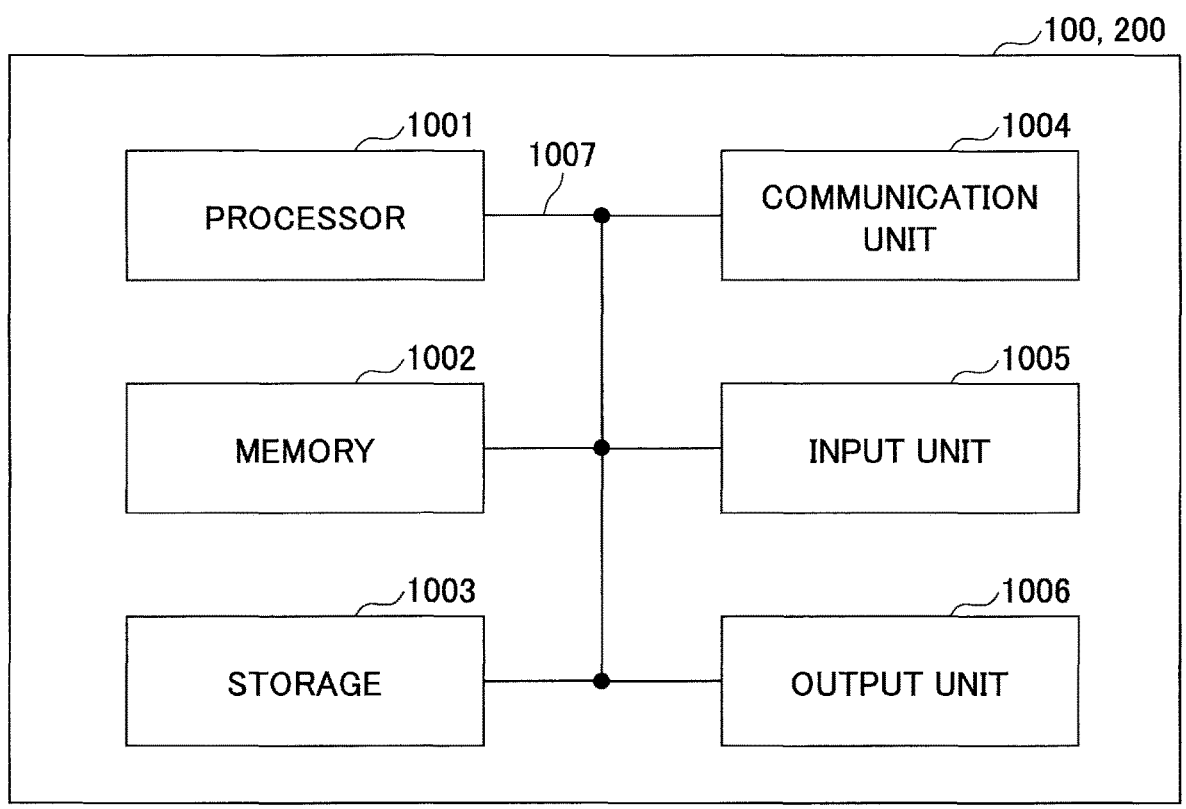
FIG. 11 is a diagram illustrating an example of a hardware configuration of a wireless communication apparatus according to an embodiment of the present invention.

For example, the base station, the user equipment, or the like according to an embodiment of the present invention may function as a computer to execute a process of the random access method according to the present invention. FIG. 11 is a diagram illustrating an example of a hardware configuration of a wireless communication apparatus as the base station 100 or the user equipment 200 according to an embodiment of the present invention. The base station 100 and the user equipment 200 described above may be physically configured as a computer device including a processor 1001, a memory 1002, a storage 1003, a communication unit 1004, an input unit 1005, an output unit 1006, and a bus 1007.

Note that in the following description, the term "apparatus" may be replaced with a circuit, a device, a unit, or the like. The hardware configuration of the base station 100 and the user equipment 200 may be configured to include one or more of the devices illustrated in the figures, or may be configured not to include a part of the devices.

Each function of the base station 100 and the user equipment 200 may be implemented by loading predetermined software (a program) into the hardware such as the processor 1001 and the memory 1002, so that the processor 1001 executes operations to control communication by the communication unit 1004, and/or reading and/or writing data on the memory 1002 and the storage 1003.

The processor 1001 controls the entire computer, for example, by running an operating system. The processor 1001 may be constituted with a central processing unit (CPU) including an interface with peripheral devices, a control unit, an arithmetic and logic unit, and registers. For example, the transmitter 110, the receiver 120, the configuration information manager 130, and the random access controller 140 of the base station 100, and the transmitter 210, the receiver 220, the configuration information manager 230, and the random access controller 240 of the user equipment 200, and the like described above may be implemented by the processor 1001.

Also, the processor 1001 reads out a program (a program code), a software module, or data from the storage 1003 and/or the communication unit 1004 into the memory 1002, and executes various processes accordingly. As the program, a program is used that causes the computer to execute at least a part of the operations described in the above embodiments. For example, the transmitter 110, the receiver 120, the configuration information manager 130, and the random access controller 140 of the base station 100, and the transmitter 210, the receiver 220, the configuration information manager 230, and the random access controller 240 of the user equipment 200 may be implemented by a control program that is stored in the memory 1002, and executed by the processor 1001, and the other functional blocks may also be implemented similarly. Although the various processes above have been described to be executed by the single processor 1001, the processes may be executed by multiple processors 1001 simultaneously or sequentially. The processor 1001 may be implemented by one or more chips. Note that the program may be transmitted from a network via a telecommunication channel.

The memory 1002 is a computer-readable recording medium, which may be constituted with, for example, at least one of a ROM (Read-Only Memory), an EPROM (Erasable Programmable ROM), an EEPROM (Electrically Erasable Programmable ROM), and a RAM (Random Access Memory). The memory 1002 may be referred to as a register, a cache, a main memory (a main storage device), and the like. The memory 1002 can store a program (a program code), a software module, and the like that can be executed for implementing the random access method according to an embodiment of the present invention.

The storage 1003 is a computer-readable recording medium, which may be constituted with, for example, at least one of an optical disk such as a CD-ROM (Compact Disc ROM), a hard disk drive, a flexible disk, a magneto-optical disk (e.g., a compact disk, a digital versatile disk, or a Blu-ray (registered trademark) disk), a smart card, a flash memory (e.g., a card, a stick, or a key drive), a floppy (registered trademark) disk, and a magnetic strip. The storage 1003 may be referred to as an auxiliary storage device. The storage medium described above may be, for example, a database, a server, or any other appropriate medium that includes the memory 1002 and/or the storage 1003.

The communication unit 1004 is hardware (a transceiver device) for executing communication between computers via a wired and/or wireless network, which may be referred to as, for example, a network device, a network controller, a network card, or a communication module. For example, the transmitter 110, the receiver 120, the transmitter 210, the receiver 220 and the like described above may be implemented in the communication device 1004.

The input unit 1005 is an input device to receive input from the outside (e.g., a keyboard, a mouse, a microphone, a switch, a button, and a sensor). The output unit 1006 is an output device to execute outputting to the outside (e.g., a display, a speaker, and an LED lamp). Note that the input unit 1005 and the output unit 1006 may be configured as an integrated unit (e.g., a touch panel).

Also, the devices such as the processor 1001 and/or the memory 1002 are connected via a bus 1007 for communicating information. The bus 1007 may be constituted with a single bus, or may be constituted with buses which are different among the devices.

Also, the base station 100 and the user equipment 200 may be configured to include hardware such as a microprocessor, a digital signal processor (DSP), an ASIC (Application Specific Integrated Circuit), a PLD (Programmable Logic Device), and an FPGA (Field Programmable Gate Array), and a part of or all of the functional blocks may be implemented by the hardware. For example, the processor 1001 may be implemented by at least one of these hardware components.

Effects of Embodiment of the Present Invention

According to an embodiment of the present invention, it is possible to allocate a RACH resource by the units of OFDM symbols in a slot. Furthermore, it is possible to allocate a RACH resource in an appropriate position depending on use cases and the like, and for example, it is possible to place downlink control information, an SS block, and the like in a slot in which a RACH resource is allocated. For example, even in the case where multiple SS (Synchronization Signal) blocks are placed depending on the supposed number of beams on the side of the base station, it is possible to reduce the random access delay by placing RACH resources in the same slots as the SS blocks.

In the case where a RACH resource is allocated by the starting index of the RACH resource, it is possible to flexibly allocate the RACH resource in a slot. Also, in the case of allocating a RACH resource from the back of a slot, it is possible to avoid downlink control information, an OFDM symbol, an SS block, and the like necessary for transmission of other downlink data, and further, it is possible to reduce a signaling overhead compared with a case of indicating the starting index. Also, in the case of allocating a RACH resource by the relative position with respect to an SS block, it is possible to reduce a signaling overhead in the case where a RACH resource corresponding to each SS block is needed as in the case where analog beam forming is used in the base station.

Also, even in the case where the RACH resource is repeatedly placed in a slot and the same preamble is selected by multiple units of the user equipment, it is possible to avoid collision of preambles in the case where different RACH resources are used.

Furthermore, by using a preamble format, it is possible to define in advance an appropriate RACH resource placement according to the preamble format depending on a supposed use case, which enables to efficiently indicate an appropriate placement pattern of a RACH resource from the base station 100 to the user equipment 200. For example, in the case where downlink control information is placed at first several OFDM symbols, it is possible to define in advance a placement pattern of a RACH resource that avoids the first several OFDM symbols, which enables the user equipment 200 to recognize the appropriate placement pattern of the RACH resource, according to the preamble format indicated to the user equipment 200 from the base station 100.

SUPPLEMENTARY NOTES

Each of the embodiments and application examples described in the present specification may be applied to a system using LTE (Long Term Evolution), LTE-A (LTE-Advanced), SUPER 3G, MT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-Wide Band), Bluetooth (registered trademark), any other appropriate system, or a next-generation system enhanced based on these.

The terms "system" and "network" used in the present specification may be used interchangeably.

Certain operations described as performed by a base station in the present specification may be performed by its upper node in some cases. In a network including a base station and one or more network nodes, it is obvious that various operations performed for communicating with terminals can be performed by the base station and/or the network nodes other than the base station (for example, an MME or an S-SW may be considered, but not limited to these). Although a case has been exemplified in which there is a single network node other than the base station, combinations of multiple other network nodes (for example, MMEs and S-GWs) may exist.

Information or the like may be output from a higher layer (or a lower layer) to a lower layer (or a higher layer). Such information may be input and output via multiple network nodes.

The information or the like input and output as such may be stored in a specific location (for example, a memory), or may be managed in a management table. The information or the like input and output as such may be overwritten, updated or added. The output information or the like may be deleted. The input information or the like may be transmitted to another device.

Indication of information is not limited to be performed by the methods of the embodiments and application examples described in the present specification, and may be executed in other methods. For example, indication of information may be performed by physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block)), or any other signaling or combinations of these. Also, RRC signaling may be referred to as an RRC message, which may be, for example, an RRC Connection Setup message, an RRC Connection Reconfiguration message, or the like.

A determination may be made based on a value represented by one bit (0 or 1), a Boolean value (true or false), or numerical comparison (for example, comparison with a predetermined value).

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, or the like, regardless of whether it is referred to as software, firmware, middleware, a microcode, a hardware description language, or any other term.

Also, such software, instructions, or the like may be transmitted and received via a transmission medium. For example, if software is transmitted from a website, a server, or any other remote source by using a wired technology including a coaxial cable, an optical fiber cable, a twist pair, and a digital subscriber line (DSL), and/or wireless technology including communication based on infrared rays, radio waves, and microwaves, these wired and/or wireless technologies should be considered as included within definition of a transmission medium.

Information, signals, or the like described in the present specification may be represented by using any one of various different technologies. For example, data, an instruction, a command, information, a signal, a bit, a symbol, a chip, and the like mentioned throughout the above description may be represented by a voltage, a current, an electromagnetic wave, a magnetic field, a magnetic particle, an optical field, a photon or any combination of these.

Note that each of the terms described in the present specification and/or a term that may be necessary to understand the present specification may be replaced with a term having the same or similar meaning. For example, a channel and/or a symbol may be a signal. Also, a signal may be a message. Also, a component carrier (CC) may be referred to as a carrier frequency, a cell, or the like.

Also, information, a parameter, and the like described in the present specification may be represented by an absolute value, a relative value with respect to a predetermined value, or any other corresponding information item. For example, a wireless resource may be designated by an index.

A name used for a parameter as described above should not be considered as restrictive in any respect. Further, in some cases, an expression, a formula, or the like using such parameters may have a representation different from the one explicitly disclosed in the present specification. Since various channels (for example, PUCCH, PDCCH, and the like) and information items (for example, TPC and the like) can be distinguished with any favorable names, the names assigned to these various channels and information items should not be considered as restrictive in any respect.

The term "determining" used in the present specification may cover various operations. For example, "determining" may cover determination or decision made with calculating, computing, processing, deriving, investigating, looking up (for example, looking up a table, a database or any other data structure), and ascertaining. Also, "determining" may cover determination or decision made with receiving (for example, receiving information), transmitting (for example, transmitting information), inputting, outputting, and accessing (for example, accessing data in a memory). Also, "determining" may cover determination or decision made with resolving, selecting, choosing, establishing, comparing, and the like. In other words, "determining" may cover determination or decision made with an operation.

The wording "based on" used in the present specification does not mean "based only on" unless otherwise specified. In other words, the wording "based on" means both "based only on" and "based at least on".

Any reference to elements specified with the words "first", "second", and so on used in the present specification does not limit the amount or the sequence of these elements in general. These words may be used in the present specification as a convenient way for distinguishing multiple elements among each other. Therefore, a reference to first and second elements does not mean that only the two elements are supposed in the context, or the first element should be considered to precede the second element in some way.

The words "include", "including", and variations of these are used to imply comprehensiveness as meant by "comprising", as long as these terms are used in the present specification and the claims. Further, the term "or" used in the present specification and the claims are intended not to mean exclusive OR.

Processing steps, sequences, flowcharts, and the like of the embodiments and application examples described in the present specification may have a changed sequence of steps as long as no contradiction arises. For example, in each of the methods described in the present specification, various steps are simply presented in an exemplary order, and are not limited to the presented particular sequence.

Each of the embodiments and application examples described in the present specification may be used alone, in combination with the others, or switched to the other during execution. Also, indication of predetermined information (for example, indication of "something being X") is not limited to an explicit indication, and may be performed implicitly (for example, by not indicating the predetermined information).

As above, the present invention has been described in detail, and it is apparent to those skilled in the art that the present invention is not limited to the embodiments described in the present specification. The present invention can be implemented by an embodiment with modifications and variations without deviating from the intention and scope of the present invention as implied by the claims. As such, the description in the present specification is intended as exemplary description, and by no means restricts the present invention.

DESCRIPTION OF THE REFERENCE NUMERALS 100 base station
110 transmitter
120 receiver
130 configuration information manager
140 random access controller
200 user equipment
210 transmitter
220 receiver
230 configuration information manager
240 random access controller

The invention claimed is:

1. A terminal comprising:
a receiver that receives configuration information for random access;
a processor that determines a starting symbol position of a random access resource in one or more slots based on the configuration information; and
a transmitter that transmits a preamble in a resource starting from the starting symbol position and ending at a last symbol position in one of the one or more slots,
wherein the processor is further configured to determine the starting symbol position based on a subcarrier spacing of 1.25 kHz, 5 kHz, 15 kHz, 30 kHz, 60 kHz, or 120 kHz,
wherein the processor determines, based on the configuration information, a plurality of random access resources which are repeatedly placed in the resource starting from the starting symbol position,
wherein the transmitter transmits the preamble using at least one of the plurality of random access resources, and
in a case where the configuration information indicates that the plurality of random access resources which are repeatedly placed in the resource are located only in the second half of the slot, the transmitter transmits the preamble using the at least one of the plurality of random access resources located in the second half of the slot.

2. The terminal as claimed in claim 1, wherein the processor determines a preamble format based on the configuration information, and
wherein the transmitter transmits the preamble using the preamble format.

3. A preamble transmission method comprising:
receiving configuration information for random access;
determining a starting symbol position of a random access resource in one or more slots based on the configuration information; and
transmitting a preamble in a resource starting from the starting symbol position and ending at a last symbol position in one of the one or more slots,
wherein the starting symbol position is determined based on a subcarrier spacing of 1.25 kHz, 5 kHz, 15 kHz, 30 kHz, 60 kHz, or 120 kHz,
determining, based on the configuration information, a plurality of random access resources which are repeatedly placed in the resource starting from the starting symbol position,
transmitting the preamble using at least one of the plurality of random access resources, and
in a case where the configuration information indicates that the plurality of random access resources which are repeatedly placed in the resource are located only in the second half of the slot, transmitting the preamble using the at least one of the plurality of random access resources located in the second half of the slot.

4. A base station comprising:
a transmitter that transmits configuration information for random access to a terminal;
a processor that determines a starting symbol position of a random access resource in one or more slots based on the configuration information; and
a receiver that receives a preamble in a resource starting from the starting symbol position and ending at a last symbol position in one of the one or more slots,
wherein the processor is further configured to determine the starting symbol position based on a subcarrier spacing of 1.25 kHz, 5 kHz, 15 kHz, 30 kHz, 60 kHz, or 120 kHz,
wherein the processor determines, based on the configuration information, a plurality of random access resources which are repeatedly placed in the resource starting from the starting symbol position,
wherein the terminal transmits the preamble using at least one of the plurality of random access resources, and
in a case where the configuration information indicates that the plurality of random access resources which are repeatedly placed in the resource are located only in the second half of the slot, the terminal transmits the preamble using the at least one of the plurality of random access resources located in the second half of the slot.

5. A communication system including a base station and a terminal,
the base station comprising:
a transmitter of the base station that transmits configuration information for random access; and
the terminal comprising:
a receiver that receives the configuration information for random access;
a processor that determines a starting symbol position of a random access resource in one or more slots based on the configuration information; and
a transmitter of the terminal that transmits a preamble in a resource starting from the starting symbol position and ending at a last symbol position in one of the one or more slots,
wherein the processor is further configured to determine the starting symbol position based on a subcarrier spacing of 1.25 kHz, 5 kHz, 15 kHz, 30 kHz, 60 kHz, or 120 kHz,
wherein the processor determines, based on the configuration information, a plurality of random access resources which are repeatedly placed in the resource starting from the starting symbol position, wherein the transmitter of the terminal transmits the preamble using at least one of the plurality of random access resources, and in a case where the configuration information indicates that the plurality of random access resources which are repeatedly placed in the resource are located only in the second half of the slot, the transmitter of the terminal transmits the preamble using the at least one of the plurality of random access resources located in the second half of the slot.

\* \* \* \* \*